APPARATUS AND METHOD FOR RECOVERING FAT

Filed May 20, 1954 6 Sheets-Sheet 1

INVENTOR.
ISRAEL HARRIS CHAYEN
BY
Bertram Ottinger
ATTORNEY

Aug. 20, 1957 I. H. CHAYEN 2,803,634

APPARATUS AND METHOD FOR RECOVERING FAT

Filed May 20, 1954 6 Sheets-Sheet 2

INVENTOR.
ISRAEL HARRIS CHAYEN
BY
Bertram Ottinger
ATTORNEY

APPARATUS AND METHOD FOR RECOVERING FAT
Filed May 20, 1954 6 Sheets-Sheet 3
Fig. 7.
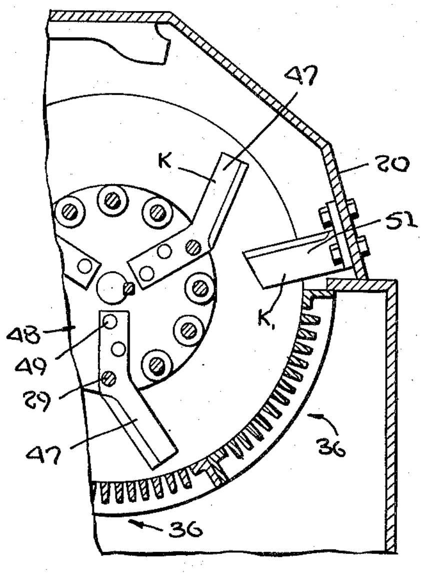
Fig. 8.
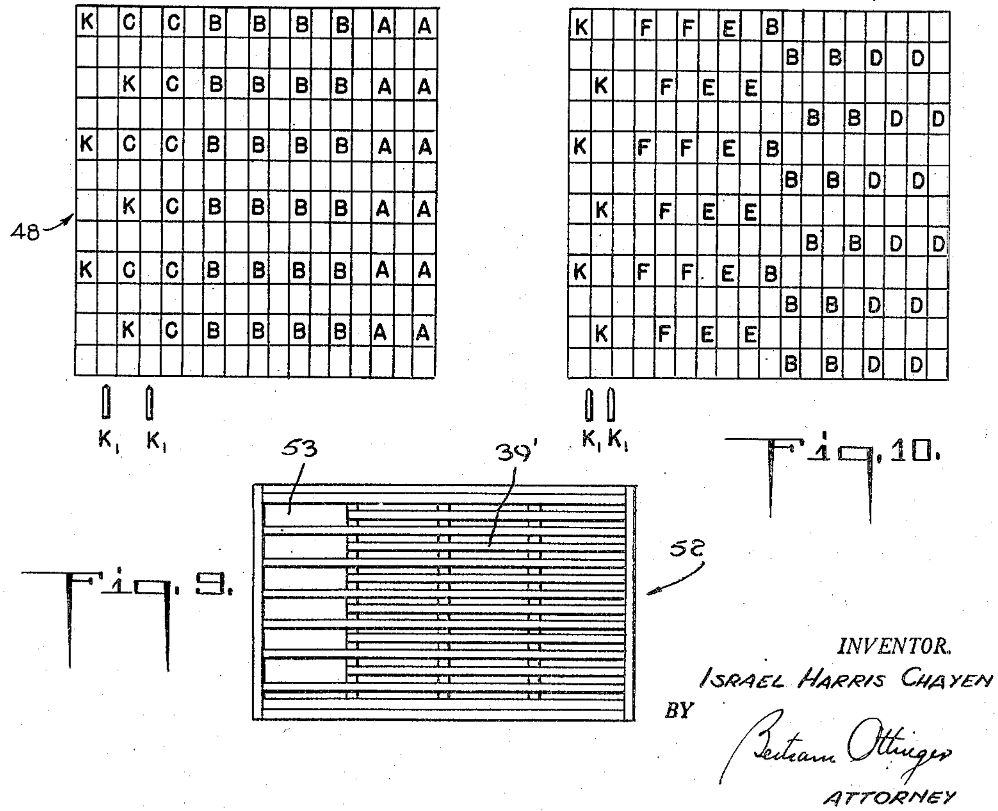
Fig. 9. Fig. 10.
INVENTOR.
ISRAEL HARRIS CHAYEN
BY
Bertram Ottinger
ATTORNEY INVENTOR.
ISRAEL HARRIS CHAYEN
BY
Bertram Ottinger
ATTORNEY INVENTOR.
ISRAEL HARRIS CHAYEN
BY
Bertram Ottinger
ATTORNEY Aug. 20, 1957 I. H. CHAYEN 2,803,634

APPARATUS AND METHOD FOR RECOVERING FAT

Filed May 20, 1954 6 Sheets-Sheet 6

INVENTOR.
ISRAEL HARRIS CHAYEN
BY
Bertram Ottinger
ATTORNEY

United States Patent Office 2,803,634 Patented Aug. 20, 1957

2,803,634

APPARATUS AND METHOD FOR RECOVERING FAT

Israel Harris Chayen, London, England, assignor to C. C. D. Processes (N. Y.) Limited, a corporation of New York Application May 20, 1954, Serial No. 431,227

19 Claims. (Cl. 260—412)

This invention relates to a hammer mill, and more particularly to a hammer mill adapted for operation upon materials having different portions of widely varying physical characteristics, such mill having particular utility as an impulse renderer of fat-containing material to rupture the walls of the fat cells and cause separation of the fat from the major portion of the nonfatty material.

In my Patent No. 2,635,104, granted April 14, 1953, I have disclosed and claimed a process of rendering fat-containing materials in which such materials are delivered into a hammer mill along with a relatively large amount of water and subjected therein to repeated intense percussive impacts in the presence of such water. Such impacts may be wholly or partly through the water and may be termed hydrodynamic impacts. Even in previously known types of hammer mills, in the presence of such water, the walls of fat-containing cells are ruptured and the fat contained therein in ejected into the surrounding water. It is preferable not to reduce the residual nonfatty material to particles of cell size as such reduction is not necessary in order to substantially completely separate the fat from the nonfatty material. A mixture of pieces of residual nonfatty material with water containing particles of fat in suspension is discharged from the mill. Such mixture can be readily settled to provide an easily separable upper fat layer containing considerable amounts of water but very little other nonfatty material, an intermediate water layer, and a lower layer containing most of the nonfatty material admixed with water.

The process just described is particularly adaptable to recovering fat from fresh animal bones. The fat is ejected from the fat cells in the bones and washed cleanly therefrom by the action of the mill above described and the bones are discharged in small pieces with the water and fat into a subsequent settling step. The pieces of bones can be removed from the water in a desired manner and are preferably washed with hot water to remove a small amount of residual fat. The bones can then be dried to produce a high quality bone material having a low fat content.

The original bones contain a substantial amount of collagen which is valuable for glue making and most of this collagen is contained in the bone particles. However, a considerable portion of this collagen is in the form of tendon or sinew relatively free from mineral matter and relatively large pieces of such sinew are present in the bones. The bones are readily shattered, but in known types of hammer mills, large amounts of power are required to reduce the large pieces of sinew to smaller pieces which will discharge through the screens and which are not easily recoverable for glue making. The bones may also contain relatively large pieces of skin and such skin also requires a relatively large amount of power for reduction to pieces of smaller size which will discharge through the screens. That is to say, hammer mills have heretofore been provided with discharge screens or grids with holes or slots therein of substantially uniform size throughout the screens.

In treating bones it has been found that holes or slots having a diameter or width of approximately 1/8 to 1/2 inch, preferably 1/4 inch, are suitable in order to reduce the size of the bones to a point where substantially all of the fat is released. There is, however, no necessity for reducing the pieces of sinew and skin to such small size. It has been found that in properly constructed hammer mills, relatively large openings can be provided in certain portions of the screen structure for discharge of relatively large pieces of sinew or skin even though substantially all of the bone is discharged through smaller openings of the size above described. This may be accomplished by introducing the bones into the mill through a feed opening which extends a small portion only of the axial length of a rotor. The material first entering the mill is impacted hydrodynamically by certain only of the hammers and must move axially of the rotor before being struck by the remaining hammers. By employing a screen structure having relatively small openings or slots in the vicinity of the feed opening, a major portion of the bones are shattered in such region of the mill and discharged through the screen. The material moving axially of the rotor is repeatedly impacted hydrodynamically by additional hammers and additional bone is broken into small pieces and discharged through the screens. Material which is more difficultly reduced in size such as pieces of sinew or skin continues to move axially of the rotor and one or more relatively large openings may be provided in the screen at a position axially removed from the feed opening for discharge of such pieces. A mill of the type just described efficiently renders fat from animal bones with very substantial savings in power and increased throughput over conventional mills and is also an efficient mill for removing fat from animal skins such as pork skins when such skins alone are fed to the mill.

When rendering the fat from bones, the relatively large pieces of sinew and skin contained in the bone are discharged with the bones and such bones are subjected to a drying operation. The relatively large pieces of sinew and skin are, however, difficult to dry. It has been found possible to provide the rotor of the hammer mill with a plurality of knives adjacent the large openings in the screens in order to cut the pieces of sinew or skin into smaller pieces before discharge. Such knives would be rapidly dulled or would be broken if employed in the portion of the mill where the bones are present in large quantities. When mounted in a position axially remote from the feed opening, they may, however, be employed to reduce the size of the pieces of sinew or skin or both while still maintaining low power consumption and high throughput.

It has been found that even greater savings of power consumption and a greater increase in throughput can be accomplished by progressively increasing the size of the holes in the screens axially along the mill from the portion of the mill adjacent the feed opening and at the same time increasing the intensity of the impulse treatment to which the material is subjected as it moves axially of the mill. Thus, the hammers nearest the feed opening may have rearwardly curved striking faces on their leading edges adjacent their outer ends and be shorter than the hammers axially most remote from the feed opening. The latter hammers may, for example, have striking faces with sharp corners at their outer ends and be longer than the hammers nearest the feed openings in order to insure breaking of all of the bone. That is to say, the hammers may progressively increase in length axially along the rotor from positions adjacent the feed opening to positions more remote from the feed opening and their striking faces may progressively have sharper corners. At the position most remote from the feed opening, the hammers on the rotors may be replaced by knives cooperating with stationary knives.

As indicated above, the mill of the present invention is particularly adaptable to the impulse rendering of bones but also has major utility in removing fat from whole animal skins and in disintegration of materials, in general, which contain relatively easily broken material along with materials which are difficult to reduce to smaller size.

It is therefore an object of the present invention to provide an improved hammer mill particularly adaptable for rendering fat from fat-containing material.

Another object of the invention is to provide an improved hammer mill in which the material being treated moves axially of the rotor of the mill from the feed entrance and is discharged through openings which are increased in size at positions axially remote from the feed opening.

A further object of the invention is to provide a hammer mill in which the material being treated moves axially of the rotor of the mill from a feed entrance and is subjected to a more drastic treatment as it moves away from said feed entrance and larger discharge openings are provided as the material moves axially away from said feed opening.

Other objects and advantages of the invention will appear in the following description of preferred embodiments thereof shown in the attached drawings, of which:

Fig. 7 is a fragmentary vertical section similar to Fig. 2, showing a portion of a modified type of rotor;

Fig. 8 is a diagrammatic developed view similar to Fig. 4, showing a modified arrangement of hammers and knives on a rotor;

Fig. 9 is a view similar to Fig. 5, showing a modified screen suitable for employment with the arrangement of hammers and knives in Fig. 8;

Fig. 10 is a view similar to Fig. 8, illustrating a modified arrangement of hammers and knives on a rotor;

Figure 1:
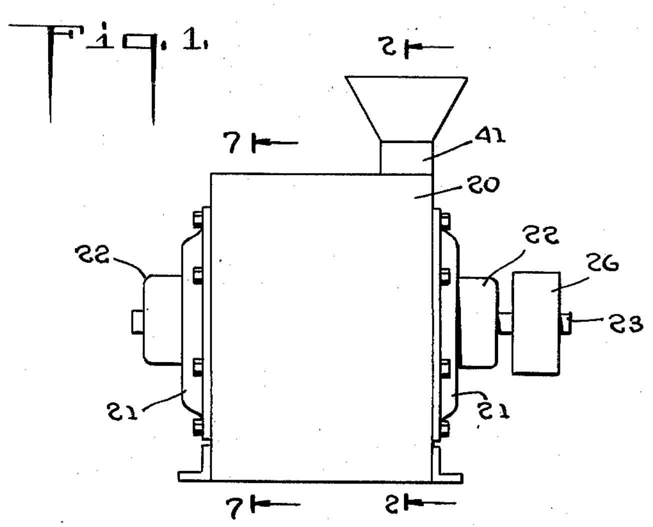
Fig. 1 is a front elevation of a hammer mill in accordance with the present invention.
Figure 2:
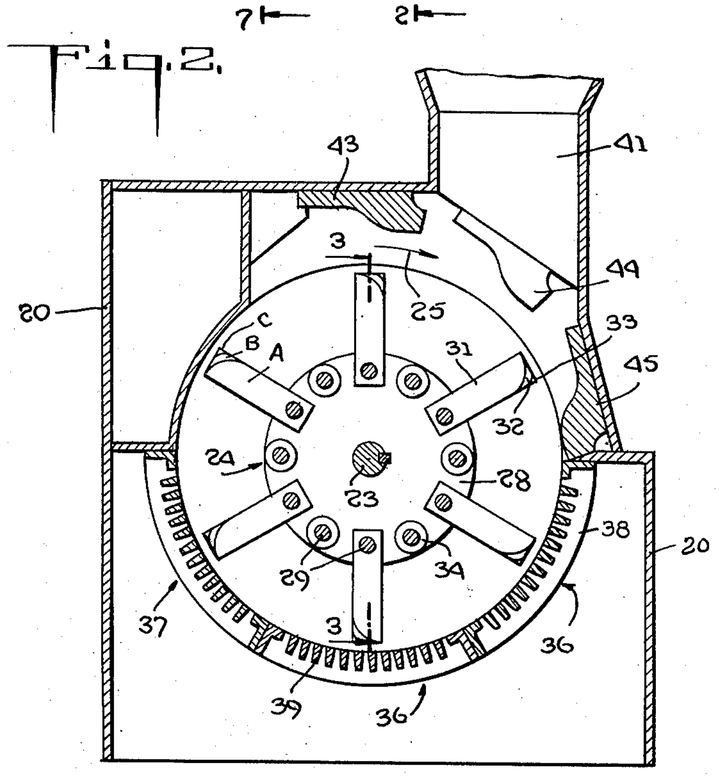
Fig. 2 is a vertical section taken on the line 2—2 of Fig. 1.

Referring more particularly to Figs. 1 and 2 of the drawings, the hammer mill of the present invention may have a casing 20 provided with end covers 21 carrying bearing structures 22 for a rotor shaft 23 carrying a rotor 24. The shaft 23 may be driven in any suitable manner, for example, through a pulley 26 so as to rotate the rotor 24 at high speed in the direction of the arrow 25 in Fig. 2.

Figure 3:
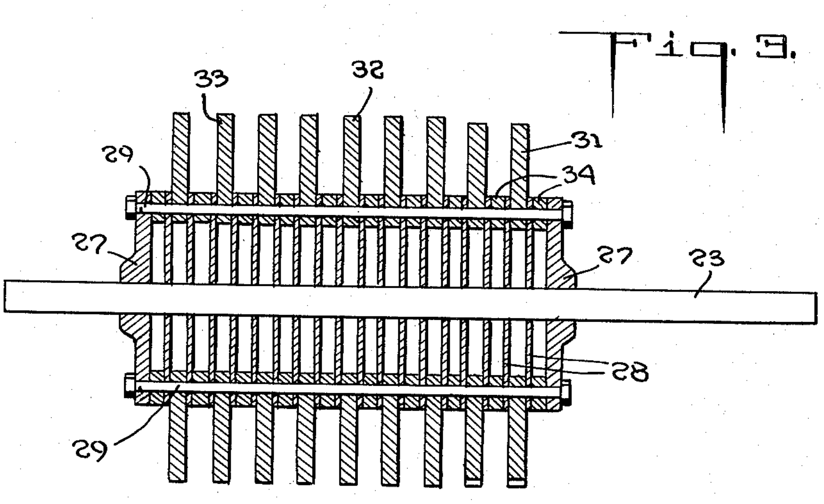
Fig. 3 is a vertical cross section through the rotor only of the hammer mill taken on the line 3—3 of Fig. 2.

A suitable structure of the rotor 24 is shown in Figs. 2 and 3 and may include a pair of end members 27 secured on the shaft 23 and a plurality of spacer discs 28 positioned between the end members 27. Bolts 29 may extend through the end members 27 and spacer discs 28 at spaced points around the periphery of the rotor and a plurality of hammers 31, 32 and 33 also designated A, B and C respectively may be journalled upon the bolts 29. Spacer members 34 may be employed between the spacer discs 28 in positions not occupied by the hammers. The rotor assembly is thus held together by the bolts 29 and the hammers have limited pivotal movement about the bolts 29.

Figure 5:
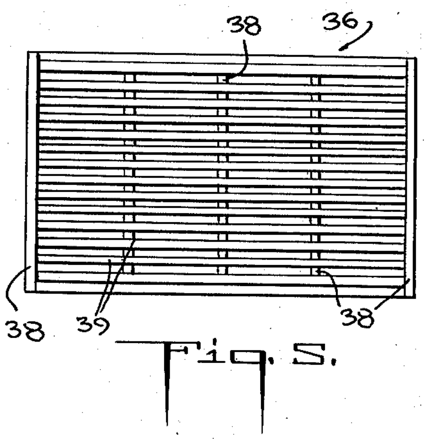
Fig. 5 is a plan view of one of the screens or grids which may be employed in the device of Figs. 1 to 4.
Figure 6:
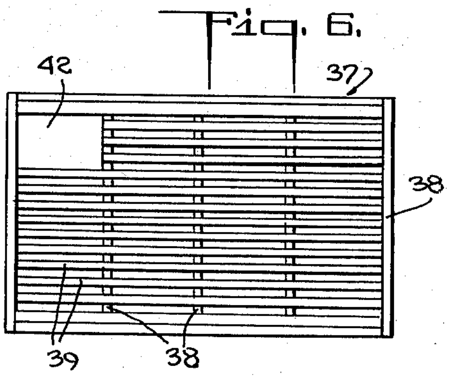
Fig. 6 is a plan view of another type of screen which may also be employed in the device of Figs. 1 to 4.

A screen structure including a plurality of screens 36 and 37 may be supported in the casing 20. The structures of such screens are shown in Figs. 2, 5 and 6. Each screen may be made up of a plurality of arcuate supporting members 38 extending circumferentially of the mill and a plurality of spaced bars 39 extending axially of the mill. The various screens are supported in the casing 20 so that their upper surfaces are concentric with the rotor 24 and spaced from the ends of the hammers 31, 32 and 33. As shown in Fig. 1, the feed entrance 41 for the device may be located adjacent one end thereof and the screen 37 (Fig. 6) may have an enlarged opening 42 at one end thereof. Thus the opening 42 is in the left most screen as viewed in Fig. 2 and this screen is positioned so that the opening 42 therein is nearest the top of the mill and axially displaced from the feed opening 41.

Figure 4:
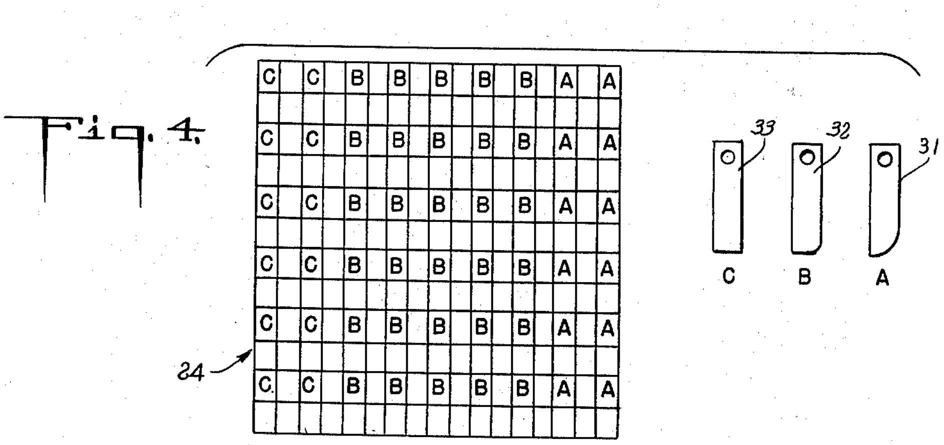
Fig. 4 is a diagrammatic developed view showing the location of the various hammers on the rotor of Fig. 3 and side elevations of the various hammers.

Fig. 4 shows the hammers A, B and C in side elevation. Fig. 4 also shows the position of the various hammers upon the rotor 24. It will be observed from Fig. 2 that there are twelve possible circumferential positions for the hammers but in the modification of Figs. 1 to 6 the hammers are arranged in six rows extending axially of the rotor. As indicated in Fig. 4, there are two rows of hammers A having striking faces which are curved rearwardly adjacent their outer corners. The two rows of these hammers are in alignment with the feed entrance 41. There are also five rows of hammers B which also have their striking faces curved rearwardly but with a lesser radius of curvature. The hammers B occupy an intermediate position axially of the rotor. There are also two rows of hammers C which have striking faces with sharp corners at their outer ends. The latter hammers are in alignment with the enlarged discharge opening 42 shown in Fig. 6. The casing 20 of the mill may also be provided with longitudinally extending breaker bars 43, 44 and 45, the breaker bar 44 being shorter than the breaker bars 43 and 45 to provide for the entrance opening 41.

The operation of the device illustrated in Figs. 1 to 6 inclusive will be described with reference to the treatment of fresh animal bones to remove the fat therefrom, although it will be apparent that the mill is adaptable for treating other materials. Fresh animal bones which have been previously roughly crushed into pieces averaging from one to two inches in their greatest dimension are fed into the mill through the opening 41 in regulated amounts, along with an amount of water which is several times the weight of the bones. The bones are struck by the hammers A which may have a peripheral speed at their ends of the order of 15,000 feet per minute and are thrown violently against the breaker bar 45. The resulting impacts may be in part or wholly through the water which is fed with the bones and in any event there is rapid movement of the broken bone particles relative to such water. The impacts in whole or part through the water break the walls of the fat cells and eject the fat therefrom and the rapid movement of the shattered particles through the water scrubs the fat from the cells. Although water is and will be specifically mentioned as a liquid in which the process is carried out, it will be understood that any other liquid may be employed which does not chemically or physically attack the material fed into the mill and which does not deleteriously affect any of the resultant products.

The water, carrying particles of fat in suspension therein, is discharged through the screens 36 and 37 along with any particles of bones sufficiently small to pass through the slots between the bars 39. Any pieces of material too large to pass through the slots between the bars 39 are carried around by the rotor in a body of water and subjected to further impacts in whole or in part through the water with the breaker bars 43 and 44 and with the hammers B and C. Substantially all of the bone is shattered and discharged through the screens before reaching the hammers C. However, large pieces of sinew and any pieces of animal skin which may be present largely retain their original size since they are not shattered by the hammers. If retained in the mill, such pieces will eventually be abraded into pieces which will pass through the slots between the bars 39 but such reduction in size requires unnecessary expenditure of power and reduces the throughput of the mill. Also, a considerable portion of valuable glue making material is lost by being carried along with the fat. By providing the enlarged opening 42, such large pieces of sinew and skin are discharged from the mill without being further reduced in size.

As a specific example the throughput through a mill having a rotor 24 inches long rotating concentrically with screens having a 12 inch radius was increased from 3810 lbs. per hour for a standard mill having 1/4 inch slots between the screen bars and 54 identical hammers arranged in 6 rows of 9 hammers each to 4700 lbs. per hour when a single relief opening such as shown at 42 in Fig. 6 was provided and the hammers modified as shown in Fig. 4. The hammers in the standard mill had striking faces with sharp corners at their outer ends and were 1 inch thick, 2 inches wide and 6 inches long so as to provide a clearance of 1" between the ends of the hammers and the screens. That is to say, the hammers were all like the hammer C of Fig. 4. In the improved mill, the hammers had the same length and clearance with respect to the screens as the hammers C but the hammers A had striking faces with a radius of curvature of 2 inches at their outer corners and the hammers B had striking faces with a radius of curvature of 1 inch at the same position. A limited number of hammers C with sharp corners were present in the mill to be sure that all of the bone was broken away from the pieces of sinew. In both runs the same size electric motor was employed to run the mill and the average power input to the motor was very nearly the same.

The pieces of sinew and skin discharged through the opening 42 are both carried along with the bones through subsequent steps in the process and are eventually dried with the bones. The small pieces of bones are dried relatively quickly for example in 40 minutes in a standard dryer but a considerably greater length of time is required to dry the larger pieces of sinew or skin, for example, four or five hours so that the size of the pieces of these materials has been the limiting factor on the length of drying time. One manner of reducing the size of such large pieces of material, without substantial increase in power consumption or substantial decrease in throughput, is to employ the knives shown in Fig. 7. In accordance with this figure a plurality of knives 47 also designated by the letter K may be carried by a rotor 48 at the end of the rotor axially displaced from the feed entrance 41. Such knives may be rigidly secured to the rotor by means of the bolts 29 and 49. These knives 47 carried by the rotor may cooperate with stationary knives 51 designated by the letter $K_1$ secured to the casing 20. A suitable arrangement of hammers and knives is indicated in Fig. 8, the hammers being of the same type as those shown in Fig. 4. The knives K and $K_1$ may be of the type shown in Fig. 7. It will be noted that the knives K and $K_1$ are in cutting relationship with respect to each other and are in alignment with the enlarged opening 42 in the screen 37 of Fig. 6. The placing of six knives K on the rotor and two stationary knives $K_1$ on the casing and rearranging the hammers as indicated in Figs. 7 and 8 reduced the size of the pieces of sinew to about 1/2 inch maximum dimension so that such pieces could be dried with the bone in about 40 minutes. The throughput remained approximately the same.

Figure 11:
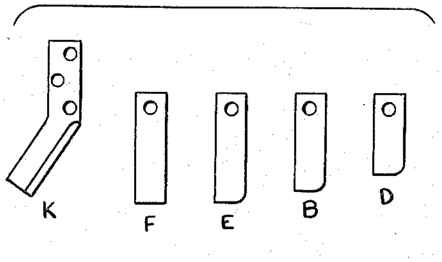
Fig. 11 shows side elevations of the hammers and knives employed in the arrangement of Fig. 10.

A further modification of the mill of the present invention is indicated in Figs. 9, 10 and 11. In Fig. 9 a screen 52 is illustrated in which every other bar 39' is shortened to provide a plurality of enlarged openings 53 axially spaced from the inlet opening 41 of the mill, the openings 53 in the screen 52 being smaller than the opening 42 in the screen of Fig. 6. A screen 52 may be substituted for each of the screens 36 and 37 of Fig. 2 so that the openings 53 are present in all of the screens employed in the mill. Screens of the type shown in Fig. 9 can be advantageously employed with an arrangement of hammers and knives such as illustrated in Fig. 10, the side elevations of the various hammers and knives being shown in Fig. 11.

It will be noted that four rows of hammers D are in alignment with the feed opening 41 (Fig. 1) of the mill and that these hammers are of shorter length than the remaining hammers. Next there are four rows of hammers B which are intermediate in length between the hammers D and the hammers E which occupy the next three rows. All of the hammers D, B and E have rearwardly curved striking faces. The rotor also has three rows of hammers F with sharp corners at their ends, the hammers F being adjacent the openings 53 in the screen 52. Also there are two rows of knives K on the rotor and two stationary knives $K_1$ cooperating therewith. It will be apparent that the material delivered into the hammer mill is subjected to increasingly drastic treatment by the hammers D, B, E and F in the order named. Substantially all of the bones are broken into small pieces and discharged through the narrow slots between the bars 39' of the screen 52. Material which does not readily break, such as pieces of sinew, and which are too large to pass through the openings 53, are cut by the knives K and $K_1$ into smaller pieces and thus discharged from the mill in smaller pieces which are more easily dried.

As a specific example the slots between the bars 39' of the screens 52 were 1/4 inch and the openings 53 in the screens were 1" by 6". The hammers D, B and E each had a radius of curvature of the striking faces of 1" at the outer corners thereof. The hammers D were 5 inches long to produce a 2" clearance with respect to the screens, the hammers B were 6 inches long to provide a clearance of 1 inch and the hammers E and F were 6½ inches long to provide a clearance of ½ inch. With this modification the throughout for the same average power was increased to 5150 lbs. per hour.

Figure 14:
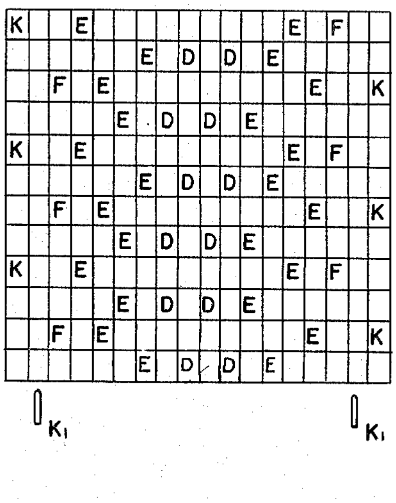
Fig. 14 is a diagrammatic developed view showing an arrangement of hammers and knives suitable for employment with the screen of Fig. 13.
Figure 12:
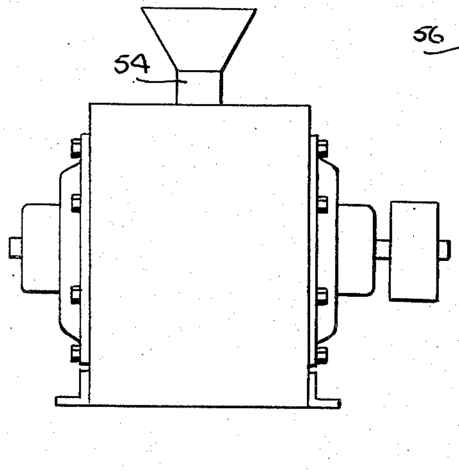
Fig. 12 is a view similar to Fig. 1, showing a modified type of hammer mill.

Fig. 12 shows a further modification of the mill. The structure of the casing of the mill may be identical with that of Figs. 1 and 2 except that the feed opening 54 is placed in the center of the mill. With this type of mill discharge screens 56 (Fig. 13) made up of a plurality of bars 57 with alternate bars shortened at their ends to provide enlarged discharge openings 58 at both ends of the mill may be employed. With such screens an arrangement of knives and hammers such as shown in Fig. 14 is suitable, the knives and hammers being of the type illustrated in Fig. 11. It will be noted that there are four rows of hammers D adjacent the center of the mill so that the shorter knives strike the entering material. There are also four rows of hammers E on each side of the knives D and then one row of the hammers F. Also there is a row of knives K at each end of the rotor cooperating with stationary knives $K_1$.

Figure 13:
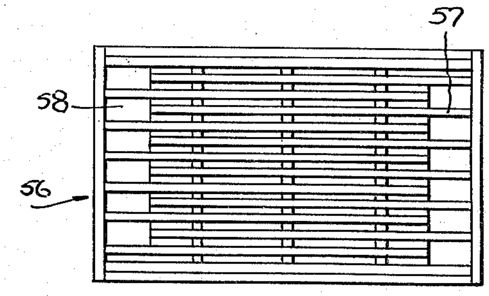
Fig. 13 is a plan view of a screen suitable for employment in the hammer mill of Fig. 12.

The center feed arrangement of Figs. 12 to 14 has been found to reduce wear which occurs at the feed end of the mills shown in Figs. 1 to 11, inclusive, and also to reduce and thrust on the bearings. Substantially all of the bone is broken into pieces small enough to be discharged through the narrow slots between the bars 57 while larger pieces which are more resistant to reduction in size, such as pieces of sinew, are discharged through the openings 58 and if too large for these openings are cut into sufficiently small pieces by the knives K and $K_1$ to be discharged.

With the modification of Figs. 12, 13 and 14 with openings 58 in the screen which are 3" by 1" and the arrangement of hammers and knives shown in Fig. 14, the throughput for the same average power was increased to 5376 lbs. per hour. In all of the runs above mentioned the speed of the rotor was 2500 R. P. M. so that the peripheral speed of the outer end of the hammers was of the order of 15,000 ft. per minute.

Figure 15:
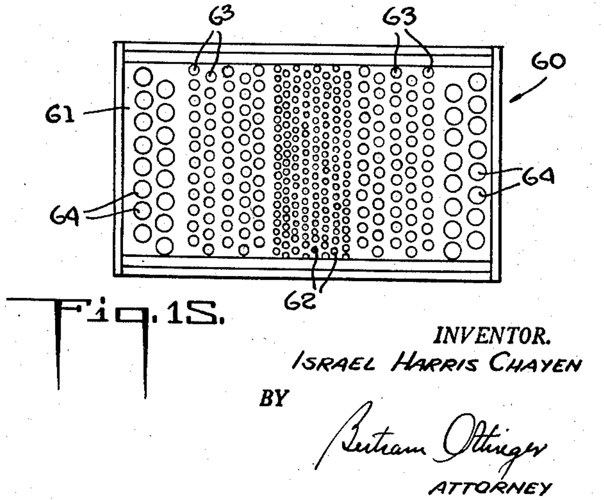
Fig. 15 is a plan view of a modified form of screen also suitable for employment with the arrangement of knives shown in Fig. 14.

A further modified screen 60 is shown in Fig. 15 and may comprise a curved perforated plate 61 having a plurality of small openings 62 in the center portion thereof, larger openings 63 on each side of the openings 62 and still larger openings 64 adjacent to the ends of the screen. The screen 60 of Fig. 15 may be employed with the arrangement of hammers and knives illustrated in Fig. 14 in the center feed mill of Fig. 12. The material fed into the mill is first struck by the short hammers E and then by the longer hammers B, and finally by the hammers C having the sharp corners at their outer ends. It will be apparent that screens made of perforated plates of the general type shown in Fig. 15 and having small holes at one end and larger holes at the other end may be substituted for the grids made of metal bars illustrated in Figs. 5, 6, 9 and 13.

In all of the mills illustrated, the material is fed into the mill at an axially restricted portion thereof where it is subjected to impact treatment, the impact treatment of the material becoming more drastic as the material moves axially of the mill. At the same time the openings in the screens employed in the mill are larger at points axially remote from the feed entrance than they are adjacent the feed entrance. The material which is more difficult to reduce in size thus receives the more drastic treatment. The fat is cleanly removed from the fat cells in the bones, even though increasingly larger pieces of bone are discharged as the material moves axially of the mill. The employment of knives to cut material such as sinew or skin which is readily severed by such knives but which resists reduction in size by impact treatment with knives enables such material to be reduced to relatively small pieces without clogging the mill or requiring undue amounts of power.

Figure 16:
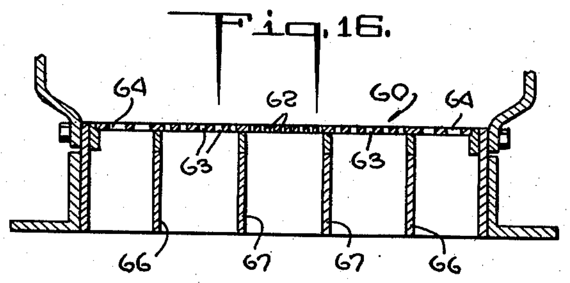
Fig. 16 is a fragmentary vertical section through a machine such as that shown in Fig. 12, illustrating a modification providing for separate discharge of various portions of the material leaving the mill.

It is sometimes desirable to separately recover different sized material discharged from the mill and a modification of the mill enabling this to be done is illustrated in Fig. 16. This figure is a fragmentary vertical cross section taken axially of the mill and shows partitions 66 and 67 positioned below a screen such as the screen 60 of Fig. 15 so that the material discharged through the openings of various size may be separately discharged from the mill and separately collected. In treating fresh animal bones, the material discharged between the partitions 67 will be largely small particles of bones and small particles of fat suspended in water. Somewhat larger particles of bones will be discharged between the partitions 66 and 67 along with additional fat suspended in water while the material discharged between the partions 66 and the ends of the mill casing will be largely pieces of sinew and pieces of any skin which may be present. Any other fibrous material which is too large to pass through the smaller openings 62 and 63 will also be discharged at the ends of the mill. The mill illustrated in Fig. 16, therefore, produces a classification of the discharged materials.

While the present invention has thus far been described particularly with reference to the rendering of fat from fresh animal bones, it will be apparent that the mill is applicable to other materials. Thus the mill of Figs. 1 to 6 is particularly suitable for defatting pig skins. Whole skins can be fed into the mill and virtually whole defatted skins discharged through the opening 42 in the grid of Fig. 6. A perforated plate of the general type shown in Figs. 15 and 16 but having larger openings axially remote from the feed entrance to the mill is particularly suitable for defatting animal skins. Such a plate results in much less abrasion of the skins than do screens or grids made up of spaced bars while still enabling substantially complete separation of fat from the skin. Hammer mills in accordance with the present invention can also be employed to render fat from animal soft fat products and to separate stones or pits from fruit and shells and husks from nut meats, for example, in the treatment of olives and palm fruit and coconuts and palm kernel nuts. They can also be used to take the skin off fish and to dehull and delinter cotton seed.

Where certain materials are being treated it may be desirable to provide means to control the rate of passage of the materials through the mill and to prevent any of the materials short circuiting successive action of the various hammers or knives employed. Such means may comprise one or more baffles attached to the casing and extending close to the rotor. Such baffles may be inserted in place of one or more rows of hammers or knives and may be arranged so as to extend circumferentially of the rotor so as to leave apertures or reliefs in the baffles of varying sizes, thus permitting more or less rapid passage through the mill of the materials being treated. The baffles thus divide the mill axially into two or more compartments. The size of the apertures or reliefs in the baffle or baffles can be varied and also the position of such apertures or reliefs can be varied with respect to the circumference of the rotor. That is to say, an aperture or relief can be at the top or bottom or side of a given baffle and can be varied in size.

Figure 17:
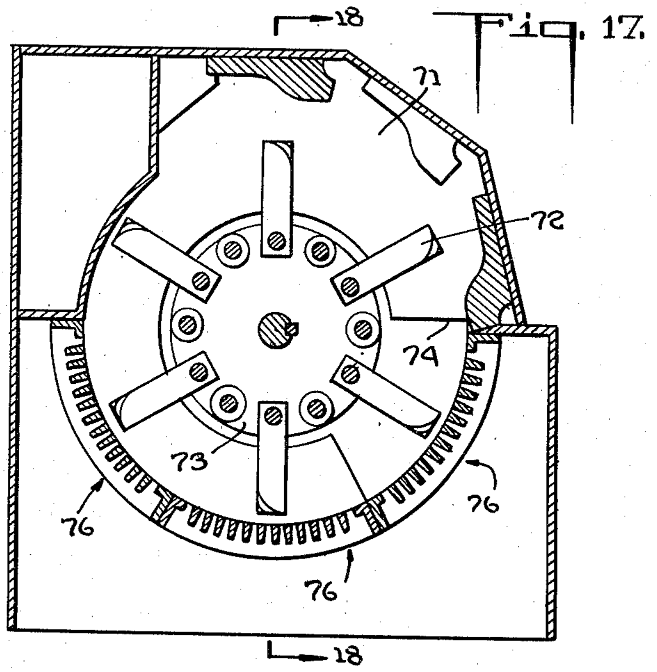
Fig. 17 is a view similar to Fig. 7 showing a further modified hammer mill employing a baffle for regulating the discharge of material from the mill.
Figure 18:
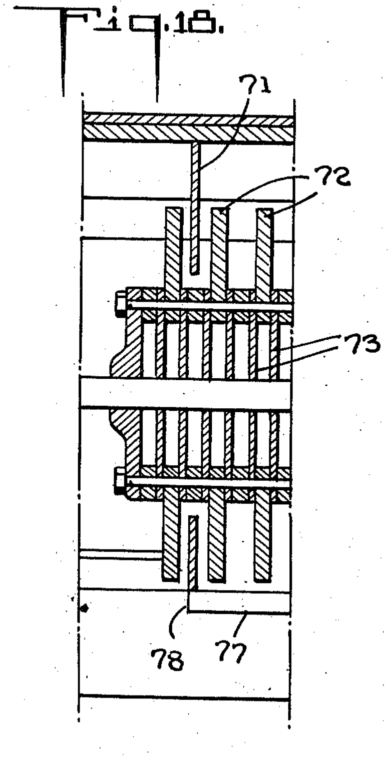
Fig. 18 is a fragmentary vertical elevation taken on the line 18—18 of Fig. 17.

A specific example of a baffle 71 is shown in Figs. 17 and 18 in position in a hammer mill of the general type shown in Figs. 1 and 2 and provided with hammers 72 on a rotor 73. Such baffle may have a gap 74 therein which extends for approximately ⅛ of the circumferential extent of baffle 71 to provide the aperture or relief mentioned above. As shown more clearly in Fig. 18, the baffle 71 may closely fit the interior of the casing of the hammer mill and extend within a short distance of the rotor 73. It may, for example, be positioned between two rows of hammers 72 as illustrated in Fig. 18. Screens 76 (Fig.

19) of the same general type shown in Fig. 6 but having all of the bars 77 thereof shortened to provide a single large opening 78 may be employed. The opening 78 may be on the other side of the baffle 71 from the inlet entrance of the machine so that large pieces of materials such as whole animal skins must pass through the opening 74 in the baffle before being discharged through the opening 78.

Figure 24:
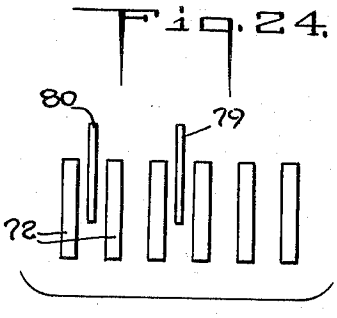
Fig. 24 is a diagrammatic view illustrating an arrangement of baffles relative to the rotor of the mill employing the baffles of Figs. 20 and 21.
Figure 19:
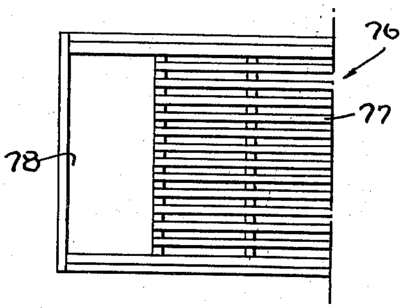
Fig. 19 is a fragmentary plan view of a modified form of screen suitable for employment with the mill of Figs. 17 and 18.
Figure 25:
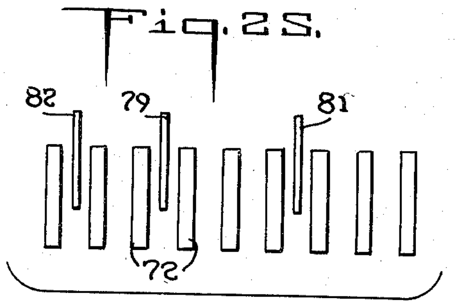
Fig. 25 is a view similar to Fig. 24 showing an arrangement employing the baffles of Figs. 20, 22 and 23.
Figure 20:
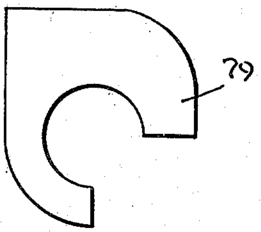
Fig. 20 is a side elevation on a reduced scale of a modified baffle also suitable for employment in the mill of Figs. 17, 18 and 19.
Figure 22:
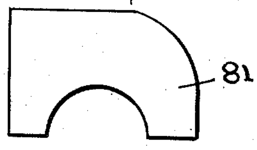
Fig. 22 is another view similar to Fig. 20 of another modified form of baffle.
Figure 21:
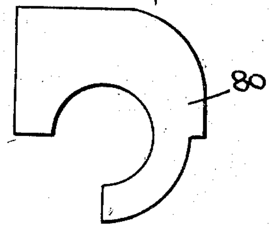
Fig. 21 is a view similar to Fig. 20 of another modified form of baffle.
Figure 23:
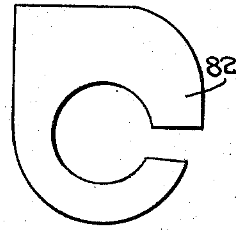
Fig. 23 is another view similar to Fig. 20 of a still further modified form of baffle.

Any one of the baffles 79, 80, 81 and 82 of Figs. 20 to 23 respectively may be substituted for the baffle 71 in the middle of Figs. 17, 18 and 19, depending upon the amount of retardation of discharge of larger pieces desired and such baffles including the baffle 71 may also be employed in combination. For example, baffles 79 and 80 of Figs. 20 to 21 inclusive may be employed together as indicated in the diagrammatic view of Fig. 24, the baffle 79 being nearest the inlet end of the mill and the baffle 80 being nearest the discharge end of the mill, both baffles being positioned between rows of hammers 72. Similarly, three baffles may be employed as indicated in Fig. 25, the baffle 81 of Fig. 22 being nearest the inlet end of the mill, the baffle 79 being next and baffle 82 being nearest the discharge end of the mill. In each of these modifications, screens 76 of Fig. 19 may be employed and the various baffles positioned such that material in the mill must pass through all of the baffles before being discharged through an opening 78. It will be understood that knives such as those shown in Fig. 7 may be employed between baffles or over the openings 78 in the screens if it is desired to cut the material passing through the baffles into smaller pieces.

The mill and modifications thereof illustrated in Figs. 17 to 25 inclusive are particularly suitable for defatting animal skins but the baffles have utility in the treatment of other materials. For most of the treatments contemplated in the various mills disclosed in the present application, the treatment will be carried on in the presence of relatively large amounts of water, for example from 3 to 30 times the weight of the material being treated and as indicated above other liquids may be substituted for the water so long as they have no deleterious action upon the materials being treated.

Figure 26:
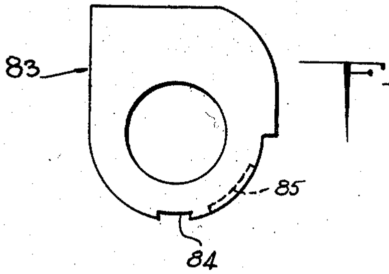
Fig. 26 is a view similar to Fig. 20 of yet another modified form of baffle.

In Fig. 26, I have illustrated another form of baffle plate 83 provided with peripheral openings 84, 85. A baffle plate of this type is suitable for instance in the depitting or destoning of olives or fruit, the openings 84 and 85 serving to retain whole fruit but to allow the stones or pits to pass. The openings may be short as indicated at 84 or elongated as indicated at 85, or a combination of different length openings may be employed.

This application is a continuation-in-part of my copending application Serial No. 322,713, filed November 26, 1952, which in turn was copending with and is a division of my application Serial No. 237,327, filed July 18, 1951, now Patent No. 2,635,104, granted April 14, 1953.

What is claimed is:

1. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, said screen structure having at least one screen opening adjacent the ends of the hammers below the drive shaft and axially remote from said feed opening which said one screen opening is substantially larger than the screen openings adjacent the ends of said certain hammers, said casing having a discharge opening for discharging from said mill material passing through said screen openings.

2. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, said screen structure having at least one screen opening adjacent the ends of the hammers below the drive shaft and axially remote from said feed opening which said one screen opening is substantially larger than the screen openings adjacent the ends of said certain hammers, a baffle extending inwardly from said casing and said screen structure and circumferentially around said rotor intermediate its ends, said baffle having an opening of limited circumferential extent for restricting said movement of said material axially of said rotor, said casing having a discharge opening for discharging from said mill material passing through said screen openings.

3. A rotary hammer mill as defined in claim 2 in which a plurality of said baffles axially spaced from each other are present in said mill.

4. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, said screen structure having at least one screen opening adjacent the ends of the hammers below the drive shaft and axially remote from the said feed opening which said one screen opening is substantially larger than the screen openings adjacent the ends of said certain hammers, said casing having a discharge opening for discharging from said mill material passing through said screen openings, said certain hammers having striking faces which curve rearwardly at their radially outer ends.

5. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, said screen structure having at least one screen opening adjacent the ends of the hammers below the drive shaft and axially remote from said feed opening which said one screen opening is substantially larger than the screen openings adjacent the ends of said certain hammers, said casing having a discharge opening for discharging from said mill material passing through said screen openings, said certain hammers having striking faces which curve rearwardly at their radially outer ends, and at least some of said remaining hammers having striking faces which terminate in sharp corners at their radially outer ends.

6. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, said screen structure having at least one screen opening adjacent the ends of the hammers below the drive shaft and axially remote from said feed opening which said one screen opening is substantially larger than the screen openings adjacent the ends of said certain hammers, said casing having a discharge opening for discharging from said mill material passing through said screen openings, said rotor having knives secured to said rotor and extending outwardly therefrom at a position axially spaced from said certain hammers and adjacent said larger opening, and a stationary knife supported by said casing and cooperating in cutting relationship with the first mentioned knives.

7. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, said screen structure having at least one screen opening adjacent the ends of the hammers below the drive shaft and axially remote from said feed opening which said one screen opening is substantially larger than the screen openings adjacent the ends of said certain hammers, said casing having a discharge opening for discharging from said mill material passing through said screen openings, said certain hammers having their outer ends spaced a greater distance from said screen structure than said remaining hammers.

8. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, the screen openings adjacent said certain hammers being smaller than the screen openings adjacent said remaining hammers, said casing having a discharge opening for discharging from said mill material passing through said screen openings.

9. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, the screen openings adjacent said certain hammers being smaller than the screen openings adjacent said remaining hammers and the screen openings adjacent said remaining hammers being progressively larger the more axially remote they are from said certain hammers, said casing having a discharge opening for discharging from said mill material passing through said screen openings.

10. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, the screen openings adjacent said certain hammers being smaller than the screen openings adjacent said remaining hammers and the screen openings adjacent said remaining hammers being progressively larger the more axially remote they are from said certain hammers, said casing having separate openings for separately discharging from said mill material passing through the screening openings of different size.

11. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, the screen openings adjacent said certain hammers being smaller than the screen openings adjacent said remaining hammers, said certain hammers having striking faces curved rearwardly at their outer ends and having their outer ends spaced a greater distance from said screen structure than said remaining hammers, said remaining hammers having striking faces of progressively less curvature at their outer ends and progressively less spacing of their outer ends from the screen structure the more remote they are axially from said certain hammers, the more remote of said remaining hammers having striking faces with sharp outer corners, said casing having a discharge opening for discharging from said mill material passing through said screen openings.

12. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentialy of said rotor, said screen structure being adjacent and spaced radially from the outer ends of said hammers and having screen openings therein adjacent said ends of said hammers, the screen openings adjacent said remaining hammers being larger than the screen openings adjacent said certain hammers, said certain hammers having striking faces curved rearwardly at their outer ends and having their outer ends spaced a greater distance from said screen structure than said remaining hammers, said remaining hammers having striking faces of progressively less curvature at their outer ends and progressively less spacing of their outer ends from the screen structure the more remote they are axially from said certain hammers, the more axially remote of said remaining hammers having striking faces with sharp outer corners, said rotor having knives secured thereto and extending outwardly therefrom at positions spaced axially from said feed opening and adjacent said larger screen openings, and said mill having a stationary knife cooperating in shearing relationship with the knives secured to said rotor, said casing having a discharge opening for discharging from said mill material passing through said screen openings.

13. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for the feeding material to be treated into the path of certain of said hammers so as to be subjected to impacts by the last mentioned hammers, said last mentioned hammers being positioned within a limited portion of the axial extent of said rotor so that material being treated in said mill must move axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, the screen openings adjacent said certain hammers being smaller than the screen openings adjacent said remaining hammers and the screen openings adjacent said remaining hammers being progressively larger the more axially remote they are from said certain hammers, said rotor having knives secured thereto and extending outwardly therefrom at positions spaced axially from said certain hammers and adjacent the largest openings in said screen and said mill having a stationary knife cooperating in shearing relationship with the knives supported by said rotor, said casing having a discharge opening for discharging from said mill material passing through said screen openings.

14. A rotary hammer mill which comprises, a casing, a drive shaft mounted for horizontal rotation in said casing, a rotor driven by said drive shaft, a plurality of radially extending hammers carried by said rotor and spaced from each other circumferentially and axially of said rotor, said casing having a feed opening for feeding material to be treated into the path of certain of said hammers so as to be subjected to impacts by the last mentioned hammers, said last mentioned hammers being positioned within a limited portion of the axial extent of said rotor and so that material being treated in said mill must move in both directions axially of said rotor to be subjected to impacts by the remaining hammers carried by said rotor, a stationary screen structure extending axially and circumferentially of said rotor, said screen structure being adjacent and spaced radially from the outer ends of said hammers and having screen openings therein adjacent said ends of said hammers, the screen openings adjacent said certain hammers being smaller than the screen openings on either side of said certain hammers and adjacent said remaining hammers, said casing having a discharge opening for discharging from said mill material passing through said screen openings.

15. The process of treating solid material containing portions which are more easily disintegratable than other portions thereof, which process comprises, introducing said material and an amount of water greater than the amount of said material into one portion of a treating zone and therein subjecting said material to repeated intense impacts to reduce said more easily disintegratable portions to small pieces, discharging said small pieces from said zone through openings having a size which retains larger pieces of said other portions in said treating zone, said impacts causing said larger pieces to move to another portion of said treating zone, continuing to subject said larger pieces to impacts in said other portion of said zone and discharging pieces of said other portion of said material through at least one opening larger than the first mentioned openings.

16. The process of treating solid material containing portions which are more easily disintegratable than other portions thereof, which process comprises, introducing said material and an amount of water greater than the amount of said material into one portion of a treating zone and therein subjecting said material to repeated intense impacts to reduce said more easily disintegratable portions to small pieces, discharging said small pieces from said zone through openings having a size which retains larger pieces of said other portions in said treating zone, said impacts causing said larger pieces to move to another portion of said treating zone, restraining the movement of said material to said other portion of said treating zone to insure adequate treatment of said material in said one portion of said treating zone, continuing to subject said larger pieces to impacts in said other portion of said zone and discharging pieces of said other portion of said material through at least one opening larger than the first mentioned openings.

17. The process of treating solid material containing portions which are more easily disintegratable than other portions thereof, which process comprises, introducing said material and an amount of water greater than the amount of said material into one portion of a treating zone and therein subjecting said material to repeated intense impacts to reduce said more easily disintegratable portions to small pieces, discharging said small pieces from said zone through openings having a size retaining larger pieces of said other portions in said treating zone, said impacts causing said larger pieces to move to another portion of said zone, subjecting said larger pieces in said other portion of said zone to impacts of lesser intensity than the first mentioned impacts and discharging pieces of said other portion of said material through at least one opening larger than the first mentioned openings.

18. The process of treating solid material containing portions which are more easily disintegratable by impact treatment than other portions of said material, the other portions being more readily cut than the first mentioned portions, which process comprises, introducing said material and an amount of water greater than the amount of said material into one portion of a treating zone and therein subjecting said material to repeated intense impacts to reduce said more easily disintegratable portions to small pieces, discharging said small pieces from said zone through openings of a size retaining larger pieces of said other portions in said treating zone, said impacts causing said larger pieces to move to another portion of said zone, cutting said larger pieces into smaller pieces by rapidly moving knives in said other portion of said zone and discharging pieces of said other portions of said material through openings larger than the first mentioned openings.

19. The process of removing fat from solid material containing fat in cells, said material having fat containing portions which are more easily disintegratable than other portions thereof, which process comprises, introducing said material and an amount of water greater than the amount of said material into one portion of a treating zone and therein subjecting said material to repeated intense impacts to reduce said more easily disintegratable portions to small pieces and remove said fat therefrom, discharging a mixture of fat suspended in water and said small pieces from said zone prior to reducing said pieces to cell size through openings having a size retaining larger pieces of said other portions in said treating zone, said impacts causing said larger pieces to move to another portion of said zone, subjecting said larger pieces in said other portion of said zone to impacts and discharging pieces of said other portion of said material through at least one opening larger than the first mentioned openings.

References Cited in the file of this patent

UNITED STATES PATENTS

| | | |
|---|---|---|
| 37,482 | Amelung | Jan. 27, 1863 |
| 1,035,313 | Buchanan | Aug. 13, 1912 |
| 1,250,590 | Kardos | Dec. 18, 1917 |
| 1,422,761 | Hartman | July 11, 1922 |
| 1,485,416 | Keller | Mar. 4, 1924 |
| 1,698,758 | Knittel | Jan. 15, 1929 |
| 1,753,474 | Polsler | Apr. 8, 1930 |
| 1,759,905 | Keith | May 27, 1930 |
| 2,060,126 | Scheynost | Nov. 10, 1936 |
| 2,064,689 | Russwurm et al. | Dec. 15, 1936 |
| 2,153,590 | Rietz | Apr. 11, 1939 |
| 2,490,564 | Vincent | Dec. 6, 1949 |
| 2,494,107 | Ryan | Jan. 10, 1950 |
| 2,584,262 | De Lameter | Feb. 5, 1952 |
| 2,588,865 | Moldenhauer | Mar. 11, 1952 |
| 2,617,600 | Cole | Nov. 11, 1952 |

FOREIGN PATENTS

| | | |
|---|---|---|
| 645,098 | Great Britain | Oct. 25, 1950 |
| 429,383 | France | July 17, 1911 |